(12) United States Patent
Fay et al.

(10) Patent No.: US 12,444,057 B2
(45) Date of Patent: Oct. 14, 2025

(54) SYSTEMS AND METHODS FOR IMPROVED THREE-DIMENSIONAL DATA ASSOCIATION USING INFORMATION FROM TWO-DIMENSIONAL IMAGES

(71) Applicant: Rivian IP Holdings, LLC, Irvine, CA (US)

(72) Inventors: Gary Fay, Hermosa Beach, CA (US); Krishna Prasad Varadarajan Srinivasan, Mountain View, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 375 days.

(21) Appl. No.: 17/567,016

(22) Filed: Dec. 31, 2021

(65) Prior Publication Data

US 2023/0230257 A1 Jul. 20, 2023

(51) Int. Cl.
| | | |
|---|---|---|
| *G06T 7/246* | (2017.01) | |
| *G06T 7/60* | (2017.01) | |
| *G06T 7/73* | (2017.01) | |
| *G06T 7/90* | (2017.01) | |
| *G06V 20/56* | (2022.01) | |
| *G06V 20/64* | (2022.01) | |

(52) U.S. Cl.
CPC ............... *G06T 7/246* (2017.01); *G06T 7/60* (2013.01); *G06T 7/73* (2017.01); *G06T 7/90* (2017.01); *G06V 20/56* (2022.01); *G06V 20/64* (2022.01); *G06T 2207/20084* (2013.01); *G06T 2207/30252* (2013.01)

(58) Field of Classification Search
CPC .. G06T 7/246; G06T 7/60; G06T 7/73; G06T 7/90; G06T 2207/20084; G06T 2207/30252; G06T 2207/20081; G06T 2207/30261; G06V 20/56; G06V 20/64; G06V 10/25; G06V 10/82; G06V 20/58
See application file for complete search history.

(56) References Cited

U.S. PATENT DOCUMENTS

| | | | |
|---|---|---|---|
| 9,589,362 B2 * | 3/2017 | Sarkis | G06T 1/0007 |
| 10,176,404 B2 * | 1/2019 | Boulkenafed | G06V 10/764 |
| 10,430,641 B2 * | 10/2019 | Gao | G06T 7/246 |

(Continued)

FOREIGN PATENT DOCUMENTS

| | | | | |
|---|---|---|---|---|
| CN | 111108507 A | * | 5/2020 | ............... G06T 7/73 |
| CN | 113780050 A | * | 12/2021 | ......... G06V 10/7715 |

(Continued)

*Primary Examiner* — Stephen R Koziol
*Assistant Examiner* — Benedict E Lee
(74) *Attorney, Agent, or Firm* — Haley Guiliano LLP

(57) ABSTRACT

Systems and methods for associating three-dimensional bounding boxes with tracked objects are disclosed based on information gathered from objects in a two-dimensional image, for applications such as autonomous navigation. The systems and methods track an object in three-dimensional space and receive a two-dimensional image from a vehicle sensor. The system generates a three-dimensional bounding box for an object in the two-dimensional image, determines a two-dimensional image characteristic of the object, and associates the three-dimensional bounding box with the tracked object based on the three-dimensional bounding box of the object and the two-dimensional image characteristic of the object.

20 Claims, 6 Drawing Sheets

(56) References Cited

U.S. PATENT DOCUMENTS

| | | | |
|---|---|---|---|
| 11,195,065 B2* | 12/2021 | Aliamiri | G01S 17/89 |
| 11,216,971 B2* | 1/2022 | Xu | G06F 18/253 |
| 11,315,278 B1* | 4/2022 | Ulbricht | G06T 15/04 |
| 11,454,976 B1* | 9/2022 | Levinson | G05D 1/0221 |
| 11,727,691 B2* | 8/2023 | Wang | G06T 7/62 |
| 11,734,935 B2* | 8/2023 | Chen | G06V 10/774 |
| | | | 701/23 |
| 11,769,321 B2* | 9/2023 | Kozuka | G06V 40/103 |
| | | | 706/25 |
| 11,814,084 B2* | 11/2023 | Das | G01S 13/867 |
| 11,858,529 B1* | 1/2024 | Costantino | B60W 40/02 |
| 11,887,324 B2* | 1/2024 | Tan | G06T 7/70 |
| 11,922,098 B2* | 3/2024 | Porter | G06F 30/13 |
| 11,922,580 B2* | 3/2024 | Tang | G06F 18/21 |
| 12,136,269 B1* | 11/2024 | Besson | G06V 20/58 |
| 12,314,771 B2* | 5/2025 | Wang | G06F 11/3024 |
| 2016/0321515 A1* | 11/2016 | Srivastava | H04N 13/106 |
| 2019/0340432 A1* | 11/2019 | Mousavian | G06T 7/50 |
| 2022/0358315 A1* | 11/2022 | Qiu | G06V 20/56 |
| 2023/0099494 A1* | 3/2023 | Kocamaz | G06V 20/58 |
| | | | 382/103 |
| 2023/0192141 A1* | 6/2023 | Zhang | G06V 10/25 |
| 2023/0394680 A1* | 12/2023 | Mariotti | G06T 7/20 |

FOREIGN PATENT DOCUMENTS

| | | | | |
|---|---|---|---|---|
| CN | 111108507 B | * | 1/2024 | G06N 3/09 |
| EP | 3703008 A1 | * | 9/2020 | G06V 20/58 |
| KR | 2019008459 A | * | 1/2019 | H01L 27/0248 |
| KR | 20210063224 A | * | 6/2021 | G06V 10/82 |

* cited by examiner

SYSTEMS AND METHODS FOR IMPROVED THREE-DIMENSIONAL DATA ASSOCIATION USING INFORMATION FROM TWO-DIMENSIONAL IMAGES

INTRODUCTION

In autonomous and semi-autonomous vehicles, while traversing dense traffic scenarios, it can be useful for the vehicle to generate three-dimensional bounding boxes for objects surrounding the vehicle from two-dimensional images of the environment around the vehicle. In one approach, neural network machine learning models may be employed in detecting objects surrounding a vehicle and generating the three-dimensional bounding boxes. The three-dimensional bounding boxes can be associated with and used to update the state of objects surrounding the vehicle that are being tracked. However, there is a need for improved association of three-dimensional bounding boxes with the tracked objects to reduce or prevent incorrect associations of the three-dimensional bounding boxes with the tracked objects.

SUMMARY

Accordingly, systems and methods are disclosed herein that generate improved association of three-dimensional bounding boxes using information from a two-dimensional image, for applications such as autonomous navigation. In some embodiments, systems and methods of the disclosure track an object (i.e., a tracked object) in three-dimensional space. In some embodiments, the system receives a two-dimensional image from a sensor associated with the vehicle. In some embodiments, the system generates a three-dimensional bounding box for an object in the two-dimensional image. In some embodiments, the system determines a two-dimensional image characteristic of the object. In some embodiments, the system associates the three-dimensional bounding box with the tracked object based on the three-dimensional bounding box of the object and the two-dimensional image characteristic of the object. In some embodiments, the system generates improved three-dimensional bounding boxes from projections of the two-dimensional bounding boxes using the two-dimensional image characteristic of the object. In some embodiments, the association of the three-dimensional bounding box with the tracked object is improved based on the three-dimensional bounding box of the object and the two-dimensional image characteristic of the object. In some embodiments, the system may form training datasets for machine learning models that can be trained to classify input image portions to avoid false association between close objects, to assist applications such as autonomous navigation.

In some embodiments, the processing circuitry of the disclosed systems and methods is configured to track a plurality of objects in three-dimensional space, the plurality of objects included the tracked object. In some embodiments, the tracking includes storing two-dimensional image characteristics for the plurality of objects.

In some embodiments, the processing circuitry associates the three-dimensional bounding box with the tracked object by comparing the determined two-dimensional image characteristic with the stored two-dimensional image characteristics for the object.

In some embodiments, the two-dimensional image characteristic of the object is selected one or more of: a) an anchor point positioned on the two-dimensional image for the object; b) raw pixel information on the two-dimensional image for the object; or c) features of the two-dimensional image identified from a neural network.

In some embodiments, the processing circuitry of the disclosed systems and methods is configured to determine the angular orientation of the object in the two-dimensional image, wherein the generating the three-dimensional bounding box for the object is based at least in part on the angular orientation of the object. For example, the processing circuitry may determine that the object is stationary and extending towards the road to be in a perpendicular, parallel, or any angle between. By identifying the angular orientation of the object, the processing circuitry may place a fiducial point or an anchor point on the object in the image. In some embodiments, the processing circuitry is further configured to generate the three-dimensional bounding boxes by identifying the object in the two-dimensional image; determining a dimension associated with the object, and generating the three-dimensional bounding box based on the dimension associated with the object In some embodiments, the processing circuitry is further configured to generate the three-dimensional bounding box for the object in the two-dimensional image by inputting the received two-dimensional image of the object into a neural network and outputting the three-dimensional bounding box.

In some embodiments, the processing circuitry is further configured to determine an error in a first three-dimensional bounding box for the object. The processing circuitry in response to determining the error in the first generated three-dimensional bounding box for the object, generates a second three-dimensional bounding box for the object based on the three-dimensional bounding box of the object and the two-dimensional image characteristic of the object on the two-dimensional bounding box. In some embodiments, the processing circuitry is configured to generate the three-dimensional bounding box by first generating a two-dimensional bounding box for the object in the two-dimensional image.

In some embodiments, the processing circuitry is further configured to determine the two-dimensional image characteristic of the object by performing a neural network analysis on pixels of the two-dimensional image to identify the two-dimensional image characteristic of the object. In some embodiments, the processing circuitry is configured to compare color variations on the pixels of the two-dimensional image to identify the two-dimensional image characteristic of the object.

In some embodiments, the three-dimensional bounding boxes are generated using sensors on a vehicle. The sensors are configured to capture the environment surrounding the vehicle. In some embodiments, the object is a second vehicle within a predetermined distance of the vehicle.

In some embodiments, a non-transitory computer-readable medium is disclosed herein having non-transitory computer-readable instructions encoded thereon that, when executed by a processor, causes the processor to track a tracked object in three-dimensional space, receive a two-dimensional image from a sensor associated with a vehicle, generate a three-dimensional bounding box for an object in the two-dimensional image, determine a two-dimensional image characteristic of the object, and associate the three-dimensional bounding box with the tracked object based on the three-dimensional bounding box of the object and the two-dimensional image characteristic of the object.

Training datasets for such machine learning models used herein may be assembled by capturing a number of images of roads and objects surrounding a vehicle, and determining three-dimensional bounding boxes at least partially surrounding the objects. The three-dimensional bounding boxes can be generated from corresponding two-dimensional bounding boxes including characteristics associated with the object in the two-dimensional bounding boxes. The labeled images and accompanying semantic information may thus form a training dataset for training machine learning models to generate three-dimensional bounding boxes with limited overlap.

BRIEF DESCRIPTION OF THE FIGURES

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
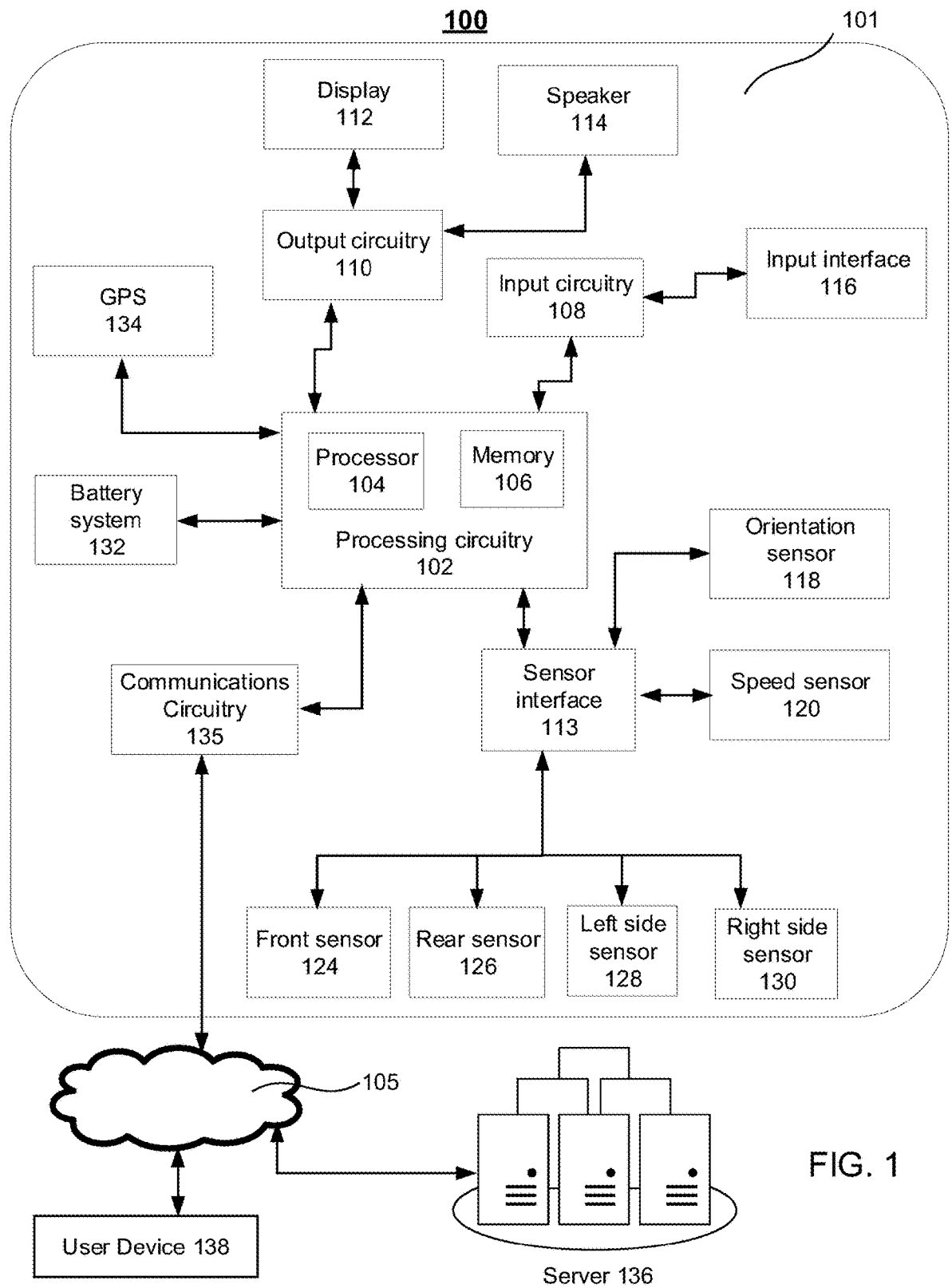
FIG. 1 shows a block diagram of components of a system configured to associate three-dimensional bounding boxes with objects based on the three-dimensional bounding boxes and two-dimensional image characteristics of the objects, in accordance with some embodiments of the present disclosure.

FIG. 1 shows a block diagram of components of a system 100 configured to associate three-dimensional bounding boxes with objects based on the three-dimensional bounding boxes and two-dimensional image characteristics of the objects, in accordance with some embodiments of the present disclosure. System 100 may include vehicle 101, which may be in communication with server 136 and user device 138 via one or more networks 105. Vehicle 101 may be a car (e.g., a coupe, a sedan, a truck, an SUV, a bus), a motorcycle, an aircraft (e.g., a drone), a watercraft (e.g., a boat), or any other type of vehicle. In some embodiments, vehicle 101 may be configured to operate autonomously or semi-autonomously.

Vehicle 101 may include processing circuitry 102. The processing circuitry may include processor 104 and memory 106. Processor 104 may include a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may include hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires or via a wireless connection.

Processing circuitry 102 may be communicatively connected to the input interface 116 (e.g., a steering wheel, a touch screen display, buttons, knobs, a microphone or other audio capture device, etc.) via input circuitry 108. In some embodiments, a driver of vehicle 101 may be permitted to select certain settings in connection with the operation of vehicle 101 (e.g., to indicate whether vehicle 101 should operate autonomously). In some embodiments, processing circuitry 102 (and/or processing circuitry of one or more servers 136) may be configured to train and/or utilize a machine learning model to detect a tracked object surrounding vehicle 101 in a current two-dimensional image (e.g., captured by one or more of sensors 124, 126, 128, 130), determine a two-dimensional image characteristic of the object, generate a three-dimensional bounding box for an object, and associate the three-dimensional bounding box with the tracked object based on the three-dimensional bounding box of the object and the two-dimensional image characteristic of the object.

In some embodiments, processing circuitry 102 may be communicatively connected to GPS system 134 or other positioning devices of vehicle 101, where the driver may interact with the GPS system via input interface 116. GPS system 134 may be in communication with multiple satellites and/or servers 136 remote from vehicle 101 to ascertain the driver's location and provide navigation directions to processing circuitry 102. As another example, the positioning device may operate on terrestrial signals, such as cell phone signals, Wi-Fi signals, or ultra-wideband signals to determine a location of electric vehicle 101. The determined location may be in any suitable form such as a geographic coordinate, a street address, a nearby landmark such as an identification of the nearest charging station or a tagged location associated with the vehicle (e.g., a location of a home of the user stored in memory 106). In some embodiments, processing circuitry 102 may use the determined location to identify whether vehicle 101 is within a threshold range of a tagged location.

Processing circuitry 102 may be communicatively connected to display 112 and speaker 114 by way of output circuitry 110. Display 112 may be located at a dashboard of vehicle 101 and/or a heads-up display at a windshield of vehicle 101. For example, an interface for GPS system 134 or an interface of an infotainment system may be generated for display, and display 112 may comprise an LCD display, an OLED display, an LED display, or any other type of display. Speaker 114 may be located at any location within the cabin of vehicle 101, e.g., at the dashboard of vehicle 101, on an interior portion of the vehicle door, etc.

Processing circuitry 102 may be communicatively connected (e.g., by way of sensor interface 113) to sensors (e.g., front sensor 124, rear sensor 126, left side sensor 128, right side sensor 130, orientation sensor 118, speed sensor 120). Orientation sensor 118 may be an inclinometer, an accelerometer, a tiltmeter, any other pitch sensor, or any combination thereof and may be configured to provide vehicle orientation values (e.g., vehicle's pitch and/or vehicle's roll) to processing circuitry 102. Speed sensor 120 may be one of a speedometer, a GPS sensor, or the like, or any combination thereof, and may be configured to provide a reading of the vehicle's current speed to processing circuitry 102. Front sensor 124, rear sensor 126, left side sensor 128, and/or right side sensor 130 may be positioned at a variety of locations of vehicle 101, and may be one or more of a variety of types, e.g., an image sensor, an ultrasonic sensor, a radar sensor, LED sensor, LIDAR sensor, etc., configured to capture characteristic of an object in a surrounding environment of the vehicle (e.g., by outputting a light or radio wave signal, and measuring a time for a return signal to be detected and/or intensity of the returned signal, and/or performing image processing on images captured by the image sensor of the surrounding environment of vehicle 101). In some embodiments, the control circuitry 102 may perform image processing on the received two-dimensional image to identify two-dimensional characteristics of an object in the image. For example, the control circuitry 102 may identify the color of the object in the two-dimensional image, an anchor point in the object in the two-dimensional image, or a combination thereof. In some embodiments, the vehicle sensors/camera system may capture images of the vehicle surroundings and process the images for pixel variations and color variation to identify objects and the characteristics of the object. For example, when an image is captured, the processing circuitry scans the image using visual recognition software to identify the object. In some embodiments, the algorithms to identify the object in the two-dimensional image are pre-trained on data collected by its partners. In some embodiments, the algorithms to identify the object in the two-dimensional image are user trained on a custom dataset. In some embodiments, processing circuitry 102 may take into account the speed and/or acceleration of vehicle 101, e.g., based on sensor data generated by speed sensor 120 and/or orientation sensor 118, when determining a predicted distance between vehicle 101 and an object.

Processing circuitry 102 may be communicatively connected to battery system 132, which may be configured to provide power to one or more of the components of vehicle 101 during operation. In some embodiments, vehicle 101 may be an electric vehicle or a hybrid electric vehicle.

In some embodiments, communications circuitry 135 (e.g., comprising a network transceiver) and/or user device 138 (e.g., a mobile device) may be in communication with one or more servers 136 (e.g., over a communications network 105 such as, for example, the Internet), which may be configured to perform any suitable portions of the processing described above and below. Server 136 may comprise a plurality of servers configured to remotely provide cloud computing resources (e.g., storage, processing, software applications, etc.) to other components of system 100, e.g., user device 138 and/or vehicle 101. In some embodiments, server 136 may be associated with a manufacturer of vehicle 101. The elements of system 100 may be configured to communicate over any suitable wireless (or wired) communication path. For example, user device 138 may be configured to communicate with vehicle 101 using a short-range radio communication technique, such as, for example, Bluetooth low energy (BLE) or near-field communication (NFC), and user device 138 and vehicle 101 may communicate with server 136 over network 105, e.g., the Internet, a local area network, a wide area network, a satellite network, a cellular network, etc. In some embodiments, server 136 may comprise one or more processors configured to perform processing-intensive tasks to aid vehicle 101 in autonomous or semi-autonomous navigation.

It should be appreciated that FIG. 1 only shows some of the components of vehicle 101, and it will be understood that vehicle 101 also includes other elements commonly found in vehicles (e.g., electric vehicles), e.g., a motor, brakes, wheels, wheel controls, turn signals, windows, doors, etc.

Figure 2:
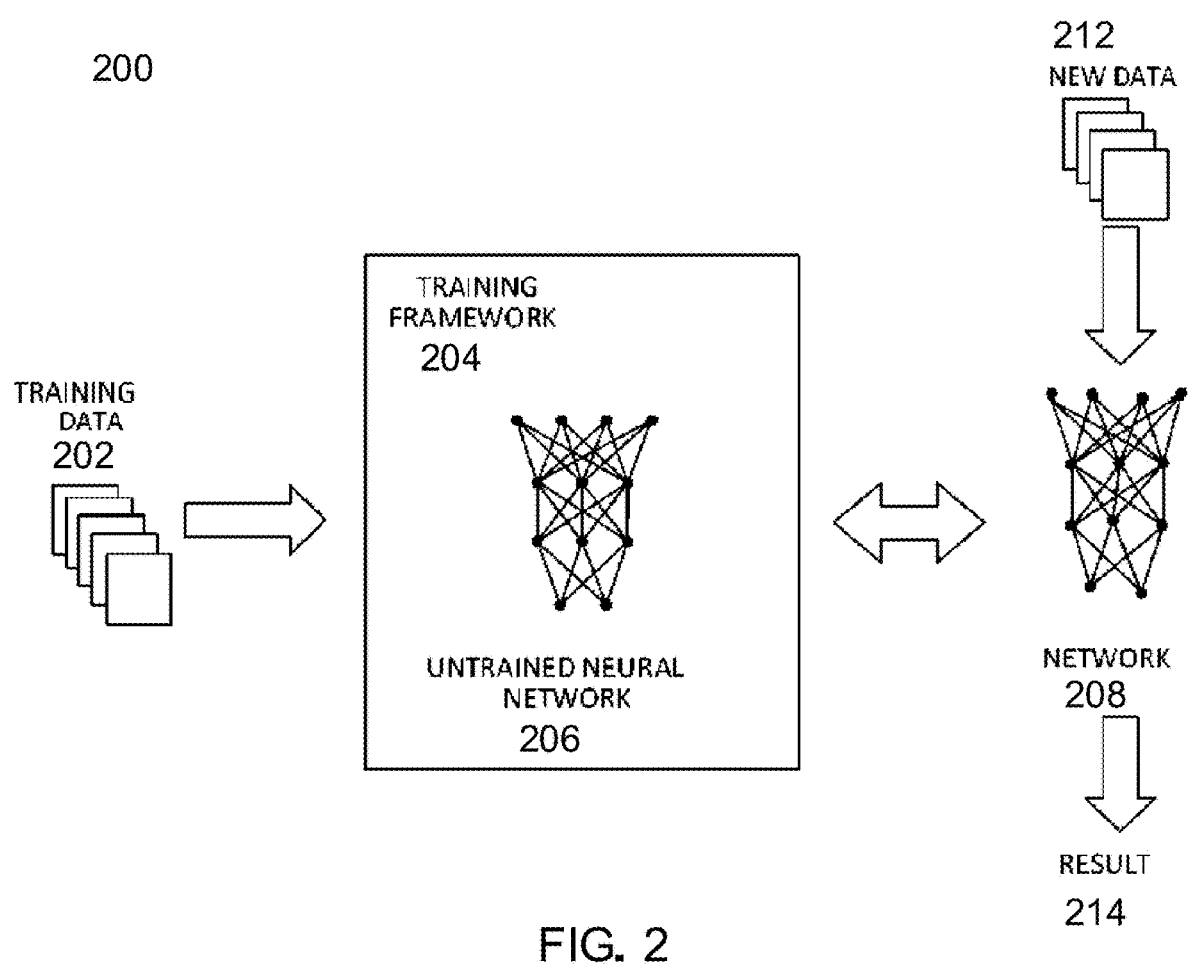
FIG. 2 shows an illustrative machine learning model for generating three-dimensional bounding boxes based on a two-dimensional image, in accordance with some embodiments of the present disclosure.

FIG. 2 shows an illustrative machine learning model for generating three-dimensional bounding boxes based on a two-dimensional image, in accordance with some embodiments of the present disclosure. Machine learning model 208 may be, e.g., a convolutional neural network (CNN), or any other suitable machine learning model trained to accept as input image 212 (e.g., a two-dimensional) of a surrounding environment of vehicle 101, and output a determination result 214 of a location, characteristics, anchor points and/or a classification of a type or class of object depicted in image 212. Training data 202 may include images of an environment surrounding vehicles and having been assigned labels. For example, each training image may be associated with a vector of any suitable number of dimensions encoding information specifying whether one or more objects are present in the training image, and if so, specifying a class or type of the object (e.g., car, pedestrian, motorcycle, animal, train, bicycle, road signs, terrain, background, etc.), specifying characteristics of the object (e.g., color, shape, dimensions, movement status (e.g., stationary or moving), etc.) and specifying parameters (e.g., x-coordinate, y-coordinate, midpoint, height, width) of a two-dimensional bounding box surrounding a perimeter of the object, and/or indicating a distance from the vehicle 101 to object annotation. Training framework 204 may train the untrained machine learning model 206 using processing resources described herein, to generate a trained machine learning model 208. In some embodiments, initial weights may be chosen randomly or by pre-training using a deep belief network. Training may be performed in either a supervised, partially supervised, or unsupervised manner. In some embodiments, the Training framework 204 may train the untrained machine learning model 206 on which bounding box to associate with which object by determining characteristics of the object.

Machine learning model 208 may be trained to output a probability of whether an input image 212 contains an object and a prediction of parameters (e.g., a location, characteristics and coordinates) of a bounding box surrounding the object in a two-dimensional image. In some embodiments, object predictions associated with a probability below a certain threshold (e.g., 0.4) may be discarded. In some embodiments, input image 212 may be divided into cells or regions according to a grid (e.g., forming an array of regions that in aggregate constitute the image), and analysis may be performed on each region of the image to output a prediction of whether an object is present and predicted bounding box coordinates within a particular region. For example, a filter or kernel of any suitable size (e.g., 3×3 pixels) may be overlaid on each region of the image, to perform a convolution, e.g., multiplying together each overlapping pixel, and adding each product together, and input to the machine learning model in outputting predictions.

In some embodiments, (e.g., such as if a regression classifier is used), untrained machine learning model 206 may be trained using supervised learning, wherein training dataset 202 includes an input paired with a desired output, or where training dataset 202 includes input having known output and outputs of neural networks are manually graded. In some embodiments, untrained machine learning model 206 may be trained in a supervised manner. Training framework 204 may process inputs from training dataset 202 and compare resulting outputs against a set of expected or desired outputs. For example, when two objects are in close proximity to each other, the training framework 204 may process the two objects including two-dimensional characteristics identified in previous models and a previous image, to improve the three-dimensional bounding box. In some embodiments, errors (bounding boxes jumping between objects over time) may then be propagated back through untrained machine learning model 206. Training framework 204 may adjust weights that control untrained machine learning model 206. Training framework 204 may include tools to monitor how well-untrained machine learning model 206 is converging towards a model, such as trained machine learning model 208, suitable for generating correct answers, such as in result 214, based on known input data, such as new data 212. In some embodiments, training framework 204 trains untrained neural network 206 repeatedly while adjusting weights to refine an output of untrained neural network 206 using a loss function and adjustment process, such as stochastic gradient descent. In some embodiments, training framework 204 trains untrained machine learning model 206 until untrained neural network 206 achieves the desired accuracy. Trained machine learning model 208 can then be deployed to implement any number of machine learning operations. In some embodiments, the machine learning model may be trained to classify pixels of input images into identifying objects of an image and generate improved three-dimensional bounding boxes that generate the vehicle with the drivable and non-drivable space, for applications such as autonomous navigation.

In some embodiments, untrained machine learning model 206 may be trained using unsupervised learning, wherein untrained machine learning model 206 attempts to train itself using unlabeled data. In some embodiments, unsupervised learning training dataset 202 may include input data without any associated output data or "ground truth" data. Untrained machine learning model 206 can learn groupings within training dataset 202 and can determine how individual inputs are related to untrained dataset 202. In some embodiments, unsupervised training can be used to generate a self-organizing map, which is a type of trained machine learning model 208 capable of performing operations useful in reducing the dimensionality of new data 212. Unsupervised training can also be used to perform anomaly detection, which allows identification of data points in a new dataset 212 that deviates from normal or existing patterns of the new dataset 212. In some embodiments, semi-supervised learning may be used, which is a technique in which training dataset 202 includes a mix of labeled and unlabeled data. Training framework 204 may thus be used to perform incremental learning, such as through transferred learning techniques. Such incremental learning may enable trained machine learning model 208 to adapt to new data 212 without forgetting knowledge instilled within the network during initial training.

Figure 3:
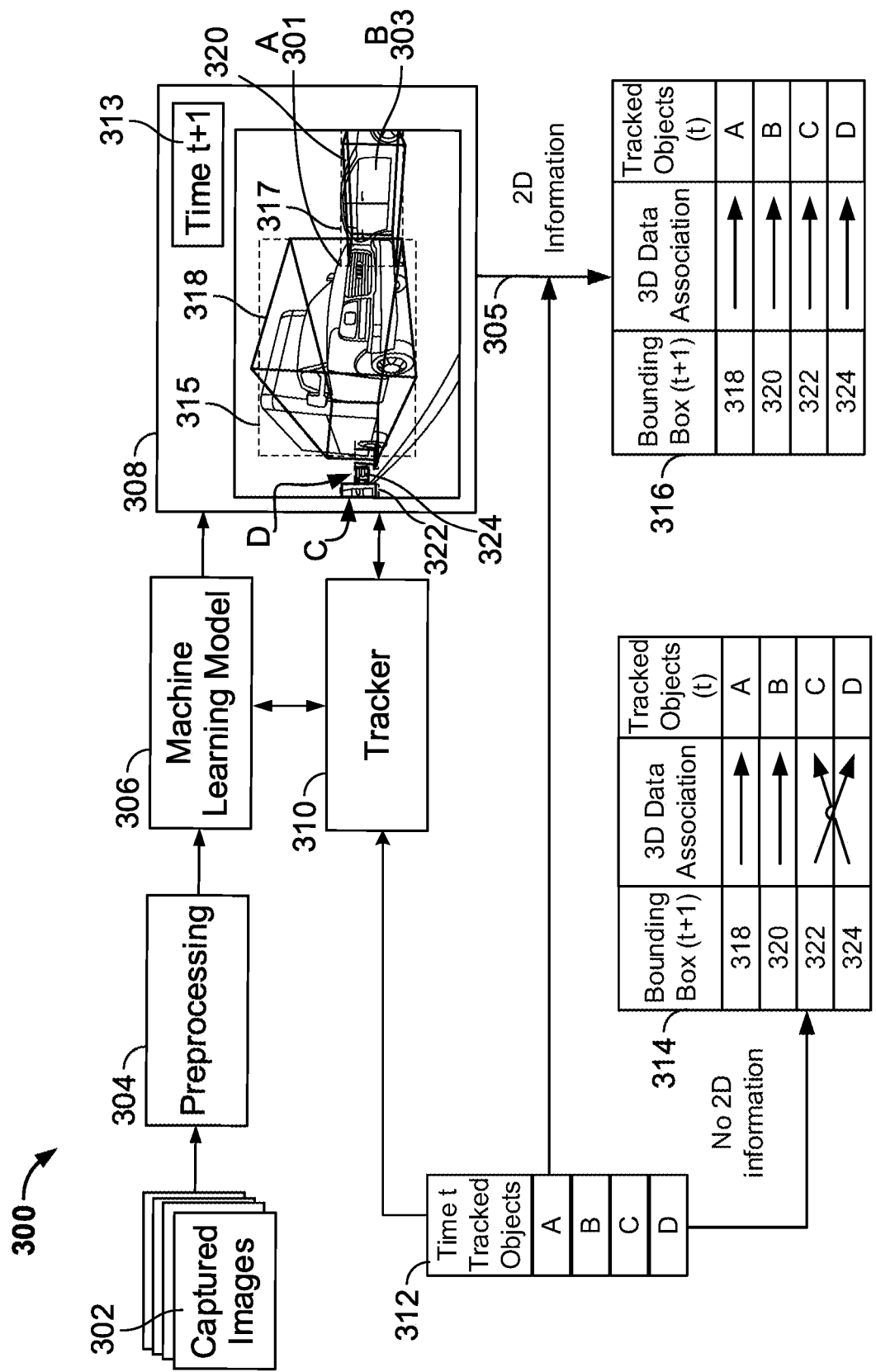
FIG. 3 shows a block diagram of components of a system configured to associate a three-dimensional bounding box with a tracked object based on the three-dimensional bounding box of the object and the two-dimensional image characteristic of the object, in accordance with some embodiments of the present disclosure.

FIG. 3 shows a block diagram of components of a system 300 configured to associate a three-dimensional bounding box with a tracked object based on the three-dimensional bounding box of the object and the two-dimensional image characteristic of the object, in accordance with some embodiments of the present disclosure. One or more images of an environment surrounding the vehicle (e.g., vehicle 101 of FIG. 1) may be captured at 302 by, e.g., image sensors (each of which may correspond to one of sensors 124, 126, 128, 130 of FIG. 1) of object 301 (which may correspond to a vehicle). Such image sensors may be mounted or positioned at any suitable portion of vehicle 101 in order to facilitate the capturing of images of the entire region or environment around vehicle 101, while vehicle 101 is stationary or in motion. For example, the one or more sensors may be disposed at one or more of a variety of locations on an exterior of, and/or an interior of, vehicle 101, e.g., sensor may be disposed at a windshield of vehicle 101, at a front bumper of vehicle 101, a roof of vehicle 101, and other sensors may be located at a rear bumper of vehicle 101, a roof of vehicle 101, a windshield of vehicle 101, respective side-view mirrors of vehicle 101, or any combination thereof. A series of images and image data may be captured by image sensors, including any suitable number of images. In some embodiments, images may be captured repeatedly as the vehicle is in motion, e.g., at a predetermined frequency, to capture the surrounding environment of vehicle 301 over time.

At 304, processing circuitry 102 of vehicle 101 (and/or processing circuitry of server 136) may be configured to perform preprocessing, e.g., to identify an object and extract suitable features from captured images 302 about the object, and/or convert identified features of captured images 302 into a matrix representation, and/or match formatting of the captured images to formatting of training data 202, normalization, resizing, minimization, etc. In some embodiments, preprocessing may comprise brightening the image or portions thereof, darkening the image or portions thereof, color-shifting the image (e.g., among color schemes, from color to grayscale, or another mapping), cropping the image, scaling the image, adjusting an aspect ratio of the image, adjusting the contrast of an image, performing any other suitable processing to prepare the image, or any combination thereof. In some embodiments, the preprocessing may generate bounding boxes around any identified objects.

At 306, processing circuitry 102 of vehicle 101 (and/or processing circuitry of server 136) may cause the captured images 302 (and/or extracted features thereof during preprocessing 304) to be input to a machine learning model 306 (which may correspond to a trained machine learning model 208). Machine learning model 306 may output (at 308), based on input images received, three-dimensional bounding boxes around tracked objects in the two-dimensional images. In the example illustrated in FIG. 3 for time t+1, object A is identified in the middle of the image, object B is identified in the right side of the image, object C is identified in the leftmost side of the image, and object D is identified in the left side of the image, and each object may be categorized by the type, color, a label on the side of the vehicle, as well as parameters of a two-dimensional and three-dimensional bounding boxes. For example, object A is characterized by a two-dimensional bounding box 315 and a three-dimensional bounding box 318, object B is characterized by a two-dimensional bounding box 317 and a three-dimensional bounding box 320, object C is characterized by a two-dimensional bounding box (not shown) and a three-dimensional bounding box 322 and object D is characterized by a two-dimensional bounding box (not shown) and a three-dimensional bounding box 324. Vehicle 101 may be traveling on a road, e.g., a highway, or may be stationary, e.g., a parking lot. It should be appreciated that the system 300 can be implemented with any type of vehicle on any type of terrain. In some embodiments, a notification associated with output 308 may be provided to the user (e.g., generated for display in vehicle 101 to depict a two-dimensional bounding box and/or a three-dimensional bounding box in real-time). In some embodiments, a tracker 310 may generate a table of tracked objects (e.g., objects A, B, C, D) in the two-dimensional image and may associate three-dimensional bounding boxes (e.g., three-dimensional bounding boxes 318, 320, 322, 324) with respective objects. For example, the three-dimensional bounding box 320 is associated with object B. In some embodiments, output 308 may be provided to the user (e.g., generated for display to depict a two-dimensional bounding box and a three-dimensional bounding box in real-time of object 301). In some embodiments, certain actions (e.g., to provide certain warning indications or suggested navigation routes related to the location of object 301, to perform autonomous driving on the basis of the location of object 301, etc.) may be suggested or automatically performed on the basis of the output 308 of machine learning model 306 at time 313, (i.e., time t+1).

The output of machine learning model 306 may be configured to generate two-dimensional and three-dimensional bounding shapes (e.g., bounding boxes, bounding polygons, bounding triangles, bounding ellipses, bounding circles, etc.) around candidate objects (e.g., vehicles, humans, animals, or other obstacles) positioned in front of, behind, or to a side of vehicle 101. In some embodiments, the plurality of images captured by the sensors of the surrounding environment of vehicle 101 may be input to machine learning model 306 in, e.g., a first-in first-out manner. In some embodiments, machine learning model 306 may be a neural network (e.g., a CNN) and/or implemented as a classification algorithm (e.g., a Naïve Bayes algorithm, a Support Vector Machine, a logistic regression, linear regression, random forest, a nearest neighbor algorithm, and/or any other suitable classifier). Classifiers are discussed in more detail in connection with commonly-owned U.S. application Ser. No. 17/225,518 filed Apr. 8, 2021, the entire contents of which are hereby incorporated by reference herein in their entirety.

Calculation of a bounding box or other bounding mechanisms may be performed in any manner, such as by known computer vision-based methods and processes for identifying an object and fitting a box to its outer edges. For example, objects and their outer boundaries may be identified and located within an image using any methods such as edge detection methods, feature searching methods, probabilistic object models, graph matching, histograms of oriented gradients (HOGs) fed into classifiers such as support vector machines, Haar Cascade classifiers, and the like. Any suitable methods are contemplated. In some embodiments, bounding boxes may be associated and accordingly fitted to identified objects in any manner, such as by drawing a rectangular box whose edges are both oriented parallel to the axes of the camera coordinate system, and are each tangent to an outer edge of the identified object. In some embodiments, bounding boxes may be fitted to identified objects by drawing a rectangular box whose vertical edges are oriented parallel to an axis of vehicle 301 whose orientation is determined by an orientation sensor of vehicle 301. Neural networks and bounding boxes are discussed in more detail in commonly-owned application Ser. No. 17/384,510, filed Jul. 23, 2021, the entire contents of which are hereby incorporated by reference herein in their entirety.

In some embodiments, the system captures information about an object from the two-dimensional image and employs that information in associating three-dimensional bounding boxes to the tracked objects. For example, the system may identify a type of object (e.g., a person, a tree, a car, a truck, a bicycle, a motorcycle, etc.), the color of the object (e.g., yellow, red, blue, etc.), an anchor point on the object (e.g., a starting point on the object for generating the bounding box), any distinguishing feature (e.g., letters, characters, etc.). In some embodiments, the captured information about the object from the two-dimensional image may be used in associating the three-dimensional bounding box to a tracked object.

Machine learning model 306 may receive additional images (e.g., within a predefined period of time, such as, for example, a few seconds), and transmit the information extracted to the tracker 310. The tracker 310 may track the identified objects as shown in table 312 of tracked objects at time t. The output from the machine learning model 306 in the shown example includes two-dimensional bounding boxes (e.g., 315 and 317) and three-dimensional bounding boxes (e.g., 318, 320, 322, and 324) associated with objects A, B, C, and D.

In some embodiments, a tracker 310, which may be implemented by processing circuitry 102 of vehicle 101 (and/or processing circuitry of server 136), may be used to composite or stitch together outputs from machine learning model 306 to track objects in the environment surrounding vehicle 101 over time using the image characteristic captured from the two-dimensional image. In some embodiments, the tracker 310 uses the three-dimensional bounding box to track the three-dimensional position of the tracked object. In some embodiments, when a three-dimensional bounding box is received corresponding to a new object, the tracker creates a new track for new object and the new track includes the two-dimensional image characteristic corresponding to the new object. In some embodiments, to track objects in the environment surrounding vehicle 101 over time using the characteristic captured from the two-dimensional image, the tracker associates identified objects with captured characteristics with bounding boxes. In some embodiments, tracker 310 may be used to check whether it performs an incorrect association of a three-dimensional bounding box with a tracked object (e.g., a bounding box associated with a red vehicle is associated with a blue vehicle). For example, tracker 310 may determine or otherwise receive information indicative of a first distance between detected object 301 and detected object 303 at time 313 (e.g., which may be determined based on output 308 and/or other image processing techniques, such as, for example, a number of pixels between vehicle 301 and bounding box 315 associated with object 301). The tracker 310 may determine or otherwise receive information (e.g., from speed sensor 120) indicative of a speed of vehicle 301. The tracker 310 may determine or otherwise receive information (e.g., from camera sensor) indicative of a three-dimensional bounding box which may include a corresponding object characteristic of vehicle 301 at time 313 (e.g., time t+1).

In some embodiments, the processing circuitry 102 may utilize an anchor point positioned on the two-dimensional image for each respective object. For example, the processing circuitry 102 may identify a point on the object in the image as a focal point and use that information to associate the corresponding three-dimensional bounding box with tracked objects. The processing circuitry 102 may store two-dimensional image information including the identified two-dimensional image characteristics of the object for a particular two-dimensional image, and subsequent received images with the same object, to further improve association of the three-dimensional bounding boxes. Subsequently, the processing circuitry may search for the same point on subsequent images. The anchor point may be a point on the edge, the middle, or any location on the object. The anchor point may also be placed on a focal point such as indicator lights, a vehicle label, or a vehicle license plate. As the vehicle 101 moves and additional images are processed, the processing circuitry 102 may identify two-dimensional characteristics of the object, for example, to the anchor point or fiducial point on the vehicle as guidance for improved the association of the three-dimensional bounding boxes. For example, when a fiducial point is identified as the indicator light in the first image at a first time, subsequent images are expected to include the same fiducial point at a similar location within the two- or three-dimensional bounding boxes.

In some embodiments, the processing circuitry 102 may utilize raw pixel information on the two-dimensional image for each respective object. For example, the processing circuitry 102 may monitor the pixel variation in an image to determine various characteristics of objects. The pixel variation may be identified based on the color difference (e.g., red pixel next to blue pixel) or based on a different shade of the same color. As the vehicle 101 moves and additional images at a time are processed, the processing circuitry 102 may revert back to the first image at a time 313 (e.g., time t+1) and in particular to the pixel variations in an image on the vehicle as guidance for associating the subsequent three-dimensional bounding boxes with the object. For example, when a pixel variation is identified on the indicator light in the first image at a first time, a subsequent image is expected to include the same pixel variations.

Tracker 310 may associate, based on the determined speed of vehicle 301, identified two-dimensional image characteristics of the object from the two-dimensional image and the determined distance between vehicle 101 and object 301, a three-dimensional bounding box with the object 301. In some embodiments, multiple images captured prior to time 313 may be analyzed in determining the speed of vehicle 301, the first distance between vehicle 101 and object 301, and/or a speed of object 301 (e.g., by comparing multiple frames depicting object 301 within a predefined time period prior to a current time). For example, a distance between object 301 and vehicle 101 is determined to be 5 meters, and each of vehicle 101 and object 301 is determined to be traveling at roughly the same speed, tracker 310 may determine that of machine learning model 306 should have indicated the presence of object 301 within a vicinity of vehicle 101 at a particular location. The tracker 310 may track one object at time or a plurality of objects as shown in table 312. In table 312, the tracker 310 is tracking objects A, B, C, D in received two-dimensional images. The tracker 310 may track any objects that come into view of the vehicle sensors. The tracker 310 is configured to receive bounding box information and track the objects. If the tracker 310 utilized only three-dimensional bounding boxes, as shown in Table 314, when the tracked object C is detected with three-dimensional bounding box 322, it is incorrectly associated with tracked object D at time t+1. Similarly, three-dimensional bounding box 324 is incorrectly associated with tracked object C at time t+1. The objects C and D are far away and the relative position of C and D may switch because of a lane change or a speed change. In previously received two-dimensional image, object D was on the left of object C, but because of a lane change by object C, C is now on the left of D. This change in position may not be identified by bounding box information alone. Such incorrect associations can lead to incorrect tracker information as illustrated in 314, where the three-dimensional association illustrated by the arrows is incorrect for objects C and D. This is problematic. For example, the incorrect associations can lead to inaccurate velocity estimations for the tracked objects. However, by utilizing two-dimensional image characteristics, tracker 310, at 305, is able to correctly associate three-dimensional bounding boxes 318, 320, 322, and 324 with tracked objects A, B, C, and D. This is illustrated in Table 16. As shown, the illustrated arrows correctly associate the three-dimensional bounding boxes 318, 320, 322, and 324 with tracked objects A, B, C and D. For example, objects C and D may be different colors and the two-dimensional image characteristic may be the color of the object. By using the object colors from the two-dimensional image, tracker 310 is able to correctly associate the three-dimensional bounding boxes with tracked objects even though the relative position between objects C and D changed. Accordingly, the use of two-dimensional image characteristics improves the data association in tracker 310.

In some embodiments, the tracker 310 may use additional information gathered from the two-dimensional image to associate the three-dimensional bounding boxes at time 313. The association of three-dimensional bounding boxes may pull in information from a previous frame to a next frame. In some embodiments, the association of three-dimensional bounding boxes may comprise performing one or more traditional computer vision techniques to search for the association of bounding box 318 to object 301. For example, computer vision convolution techniques may be employed, e.g., a kernel or filter or mask (e.g., any suitable number of pixels, e.g., 3×3 and convolved with a portion of the two-dimensional image) may be passed over portions of the image in performing edge detection (e.g., to identify color, type, anchor point) to detect a location of object 301. In some embodiments, the image may be converted to grayscale to perform image processing thereon.

In some embodiments, for associating three-dimensional bounding boxes, characteristics of the objects within the two-dimensional image within the bounding boxes may be extracted (or such features may be acquired by tracker 310 based on preprocessing 304), and/or boundaries within bounding boxes may be identified (e.g., by identifying a change in pixel intensify or gradient between adjacent pixels exists above a predefined threshold) to identify a location of an object. In some embodiments, the extracted characteristics within, for example, bounding box 315 or 318 may be compared to features stored in a database (e.g., locally at vehicle 101 or at remote server 136) in association with corresponding object classes (e.g., car, motorcycle, truck, tree, pedestrian) to detect the location of object 301 within bounding box 318 or at another portion of the image. For example, pattern matching between the extracted characteristics and features stored at server 136 may be performed. In some embodiments, the association of a bounding box to object 301 may be identified based on color thresholding. In some embodiments, a hybrid approach comprising traditional computer vision techniques and deep learning and machine learning techniques may be employed.

In some embodiments, the association of three-dimensional bounding boxes may include feedback from the image to machine learning model 306, with respect to bounding box 318 of such image. In some embodiments, processing circuitry 102 may determine that due to an occlusion of the object, it may be appropriate to revert back to the two-dimensional image to identify characteristics of the object to improve associating the three-dimensional bounding box of the occluded object. For example, tracker 310 may determine that an object has been incorrectly associated with another object, and thus one of the objects is expected to be occluded in the captured image.

In some embodiments, the association of three-dimensional bounding boxes to objects may use characteristics of each respective object in the two-dimensional image, as shown in table 316. For example, tracker 310 tracks an object at time t+1 and a two-dimensional characteristic of the object in a previous two-dimensional image 308. The tracker 310 receives a new two-dimensional image or a new two-dimensional image characteristic. The tracker 310 associates a three-dimensional bounding box of the object from the new two-dimensional image based on a characteristic of the tracked object.

In some embodiments, the generation of three-dimensional bounding boxes may use characteristics of an object in the two-dimensional image. The machine learning model 306, based on a previous association of a bounding box with an identified object, generates a two-dimensional bounding box of the object in a new two-dimensional image. The machine learning model 306 then generates a three-dimensional bounding box from the two-dimensional bounding box and the two-dimensional image characteristics (e.g., color) for the object. The tracker 310 then associates the three-dimensional bounding box to the tracked object based on the characteristic of the object.

In some embodiments, the generation of three-dimensional bounding boxes may associate characteristics of an object in the two-dimensional image to the three-dimensional bounding boxes. For example, the machine learning model 306 receives a new two-dimensional image. The machine learning model 306 identifies a two-dimensional bounding box of the object in a new two-dimensional image based on a classification algorithm (e.g., a Naïve Bayes algorithm, a Support Vector Machine, a logistic regression, linear regression, random forest, the nearest neighbor algorithm, and/or any other suitable classifier) and the characteristic of the tracked object. The machine learning model 306 then generates a three-dimensional bounding box from the two-dimensional bounding box and includes the corresponding characteristic.

Figure 4:
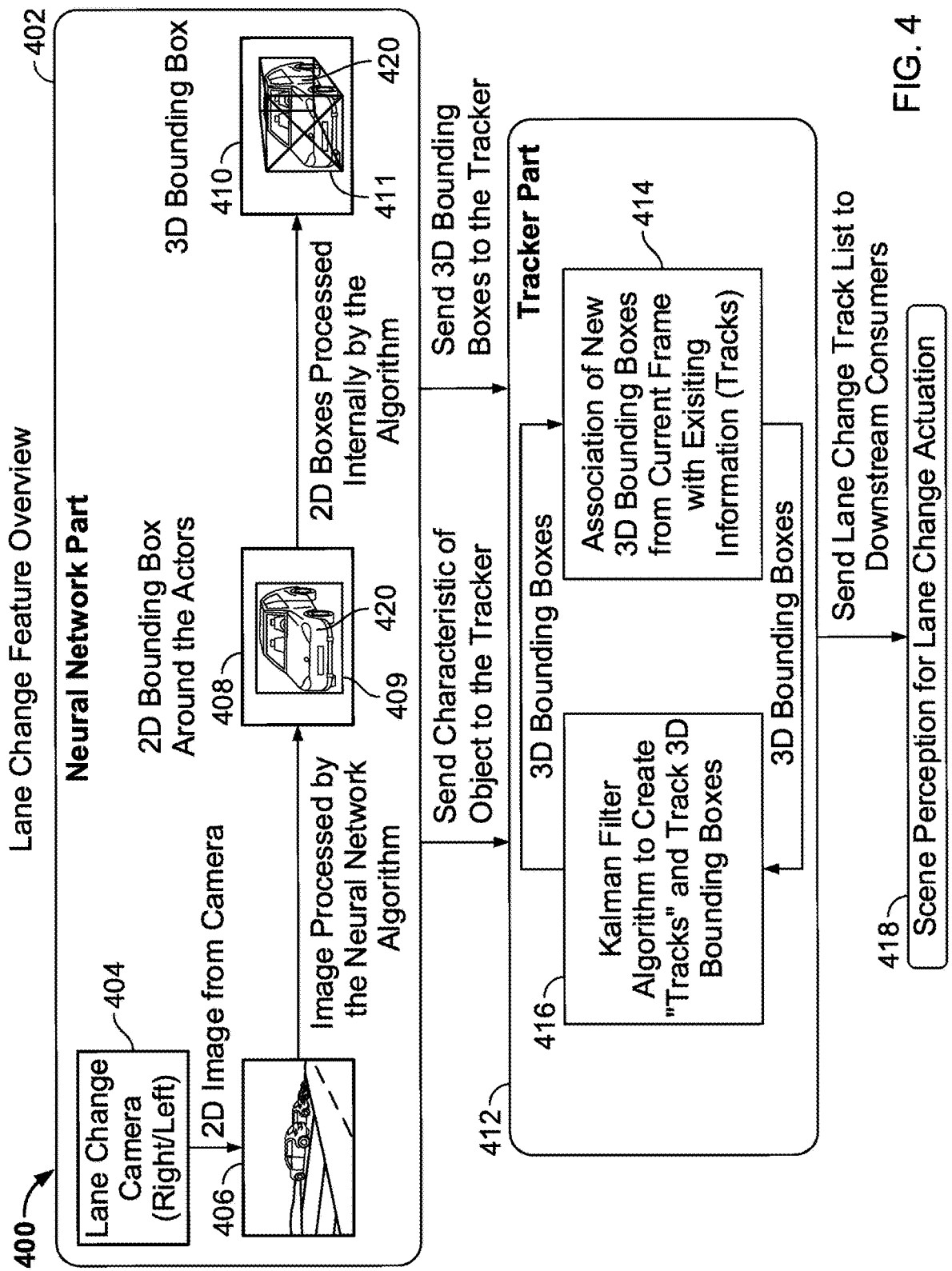
FIG. 4 shows a flowchart of illustrative process for associating the three-dimensional bounding box with a tracked object based on two-dimensional image characteristic of the object, in accordance with some embodiments of the present disclosure.

FIG. 4 shows a flowchart of illustrative process 400 for associating the three-dimensional bounding box with a tracked object based on the two-dimensional image characteristic of the object, in accordance with some embodiments of the present disclosure. Process 400 may be executed at least in part by processing circuitry 102 of vehicle 101 and/or processing circuitry of server 136, which may implement machine learning model 402 and tracker portion 412 (which may respectively correspond to machine learning model 306 and tracker 310 of FIG. 3).

At 404, processing circuitry 102 may receive from a camera a two-dimensional image of the surrounding area of the vehicle 101 (e.g., an image from a side of the vehicle from a lane change camera). In some embodiments, the processing circuitry 102 identifies a position of an object or vehicle 420. Processing circuitry 102 via the tracker portion 412 may use a motion (e.g., a speed reading indicated by speed sensor 120) of one or more of vehicle 101 and vehicle 420 (and a distance therebetween) to predict the respective positions of vehicle 101 and vehicle 420 in a subsequent frame, such as at a second image captured at a subsequent time.

At 406, processing circuitry 102 may process the two-dimensional image using any form of processing as discussed above, e.g., neural network. For example, the processing circuitry 102 may search the two-dimensional image for two-dimensional characteristics of an object, and may further identify two-dimensional characteristics to help track such objects. For example, the processing circuitry 102 may monitor the pixels of images in the surrounding area of the vehicle to identify objects. Such objects may be identified by any variations of pixel coloration, brightness, color, known template of objects (e.g., vehicle, pedestrians, trees, etc.).

At 408, processing circuitry 102 may determine a two-dimensional bounding box around the object in the image. For example, the processing circuitry 102 draws a two-dimensional bounding box 409 or other regions of interest (ROI) using the predicted positions around the vehicle 420. For example, based on pixel data of the vehicle 420 and a distance between vehicle 101 and vehicle 420, processing circuitry 102 may determine the two-dimensional bounding box 409 for vehicle 420 should be located at the location corresponding to vehicle 420.

At 410, processing circuitry 102 may generate the three-dimensional bounding box 411 around vehicle 420. The three-dimensional bounding box 411 follows the perimeter of the vehicle 420 and has an orientation and dimensions that illustrate the orientation and depth of the object. For example, based on pixel data of the vehicle 420 and a distance between vehicle 101 and vehicle 420, processing circuitry 102 may determine the three-dimensional bounding box 411 for vehicle 420 should be located at the location corresponding to vehicle 420.

At 414, processing circuitry 102 via the tracker portion 412, may associate the new three-dimensional bounding boxes from the current image (e.g., at time t+1) with the existing information of tracked objects. In some embodiments, processing circuitry 102 via the tracker portion 412, may receive two-dimensional image characteristics corresponding to a three-dimensional bounding box and associate the three-dimensional bounding box with a tracked object based on the two-dimensional characteristics. As discussed, the two-dimensional image is sourced for additional features (e.g., two-dimensional image characteristics of objects) that are then used to associate three-dimensional bounding boxes with tracked objects. For example, a machine learning model via the tracker portion 412 may associate detected objects (e.g., vehicle 420) in the two-dimensional image with three-dimensional bounding box 411 or other ROI to pass forward based on the two-dimensional image characteristics corresponding to a three-dimensional bounding box to tracker portion 412. For example, tracker portion 412 may instruct the machine learning model to associate the three-dimensional bounding box 411 with the tracked object (e.g., vehicle 420) to enable a more accurate association of the three-dimensional bounding box 411 with the tracked object. In some embodiments, processing circuitry 102 may, additionally or alternatively, perform traditional computer vision convolution techniques to identify vehicle 420 in a two-dimensional image. Based on such one or more steps of associating a three-dimensional bounding box 411 with a tracked object, vehicle 420 may be identified, and processing may be performed accordingly, e.g., by taking into account the two-dimensional characteristics of vehicle 420 during autonomous navigation.

At 416, processing circuitry 102 via the tracker portion 412, may employ the Kalman filter algorithm (linear quadratic estimation) to create a track for an object and can further track three-dimensional bounding boxes around the object. In some embodiments, the three-dimensional bounding box may be compared with a prediction generated by the Kalman filter for improved association of the three-dimensional bounding box with the tracked object. This process may be continuously updated based on the two-dimensional characteristics of the object to update any model and tracks and to better associate the bounding boxes with the respective object.

At 418, processing circuitry 102 may transmit to the vehicle of possible lane shift of the vehicle and any additional information gathered for the three-dimensional bounding boxes from the two-dimensional image. In some embodiments, the processing circuitry 102 may transmit the identified three-dimensional bounding box information and the two-dimensional characteristics of the identified objects to one or more vehicle modules for improving the autonomous driving. For example, the processing circuitry 102 may transmit the three-dimensional bounding box to the autonomous driving module or blind-spot monitoring module to indicate whether an object is blocking a lane change.

It will be understood that process 400 is merely illustrative and various modifications can be made within the scope of the disclosure and the position of the object may vary. For example, in some embodiments, step 408 can be omitted. Further, the process may be performed when the object is present anywhere around the vehicle (e.g., in front or behind the vehicle). It should also be noted that processes 400-600 may be combined sequentially, specific steps from each of the processes 400-600 may be combined to establish a separate process, among other possibilities.

Figure 5:
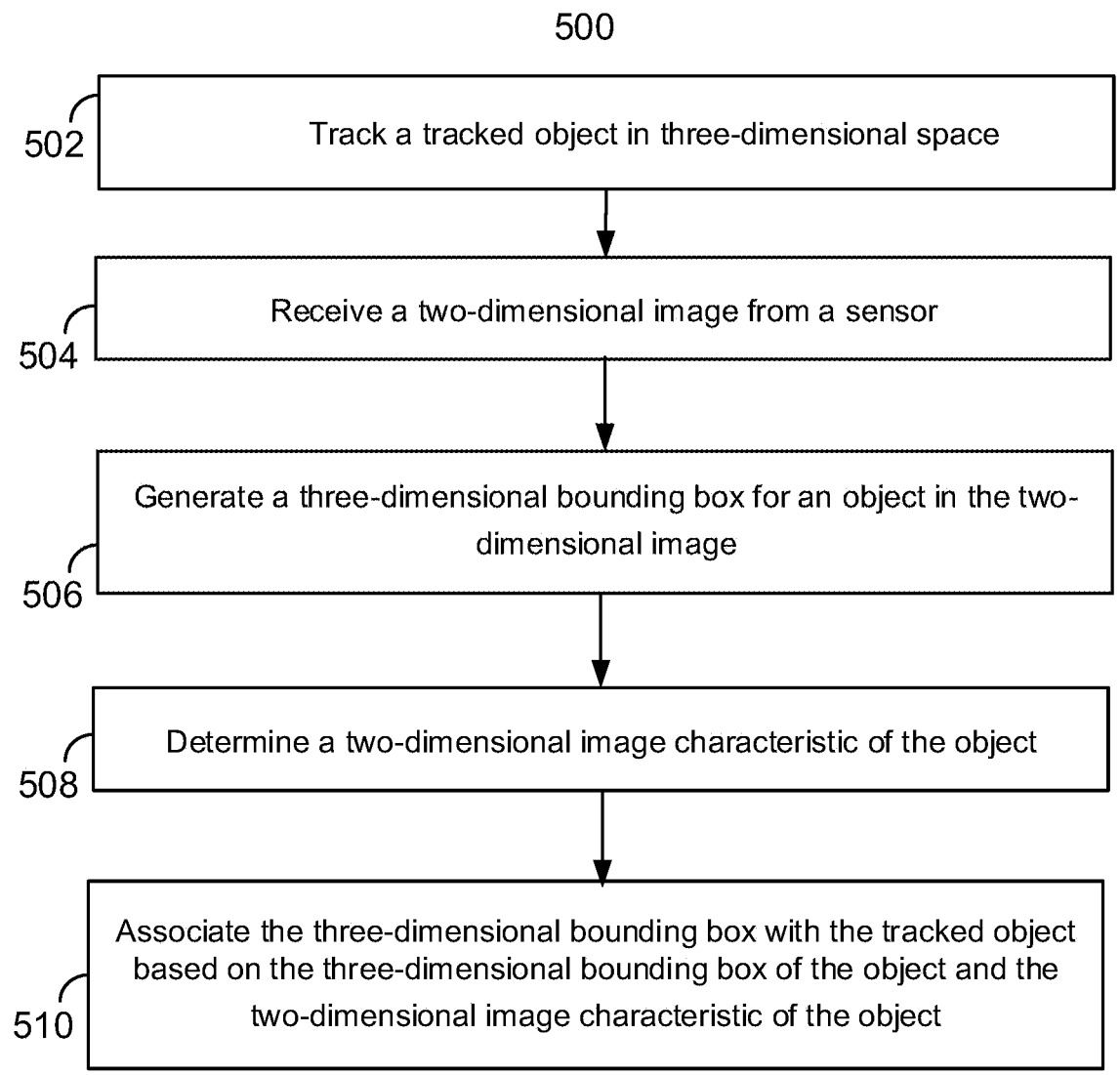
FIG. 5 shows a flowchart of an illustrative process associating the three-dimensional bounding box with a tracked object, in accordance with some embodiments of the present disclosure.

FIG. 5 shows a flowchart of an illustrative process associating the three-dimensional bounding box with a tracked object, in accordance with some embodiments of the present disclosure. Process 500 may be executed at least in part by processing circuitry 102 of vehicle 101 and/or processing circuitry of server 136.

At 502, processing circuitry 102 of vehicle 101 may track a tracked object in three-dimensional space. For example, the processing circuitry 102 identifies an object in an image and begins to track the movement of the object. To improve the accuracy of tracking the object, the processing circuitry 102 may use bounding boxes or other forms of outlining the object.

At 504, processing circuitry 102 of vehicle 101 may receive a two-dimensional image from a sensor, e.g., one of its sensors such as front sensor 124. As in FIG. 3, the image may be a two-dimensional image that includes, for example, an image of a nearby vehicle 301.

At 506, processing circuitry 102 of vehicle 101 may generate a three-dimensional bounding box for an object in the two-dimensional image. For example, the processing circuitry 102 of vehicle 101 may determine a two-dimensional bounding box relative to the object in the two-dimensional image and based on the two-dimensional bounding box, may generate a three-dimensional bounding box. In some embodiments, the processing circuitry 102 of the vehicle 101 transmits the image to a neural network to analyze and determine the placement of the two-dimensional bounding box. In some embodiments, the processing circuitry 102 of the vehicle 101 transmits the image to a neural network to analyze and determine the placement of the three-dimensional bounding box.

At 508, processing circuitry 102 of vehicle 101 may determine a two-dimensional image characteristic of the object. For example, processing circuitry 102 of vehicle 101 may utilize computer vision convolution techniques to identify a characteristic of object 301 in the image that corresponds to two-dimensional bounding box 315 or three-dimensional bounding box 318 to be used in performing subsequent processing, e.g., in performing autonomous navigation. In some embodiments, the processing circuitry 102 of the vehicle 101 transmits the two-dimensional image characteristics corresponding to an object to a tracker to assist in associating the three-dimensional bounding box with tracked objects. The two-dimensional image characteristic can include, for example, color of the object, color variations on the object, drawn characters, or any other distinguishing identifiers (e.g., shape of head lights, shape indicators lights, placements of lights).

At 510, processing circuitry 102 of vehicle 101 may associate (e.g., in three-dimensional space) the three-dimensional bounding box with the tracked object based on the three-dimensional bounding box of the object and the two-dimensional image characteristic of the object. For example, processing circuitry 102 of vehicle 101 may associate the three-dimensional bounding box with the tracked object in the image based on the three-dimensional bounding box and the characteristics of the object (e.g., vehicle). In some embodiments, tracker 310 may associate the three-dimensional bounding box 318 of object 301, corresponding to a location at which object 301 is predicted to be located, based on the color of the object, color variations on the object, drawn characters or any other distinguishing identifiers.

Figure 6:
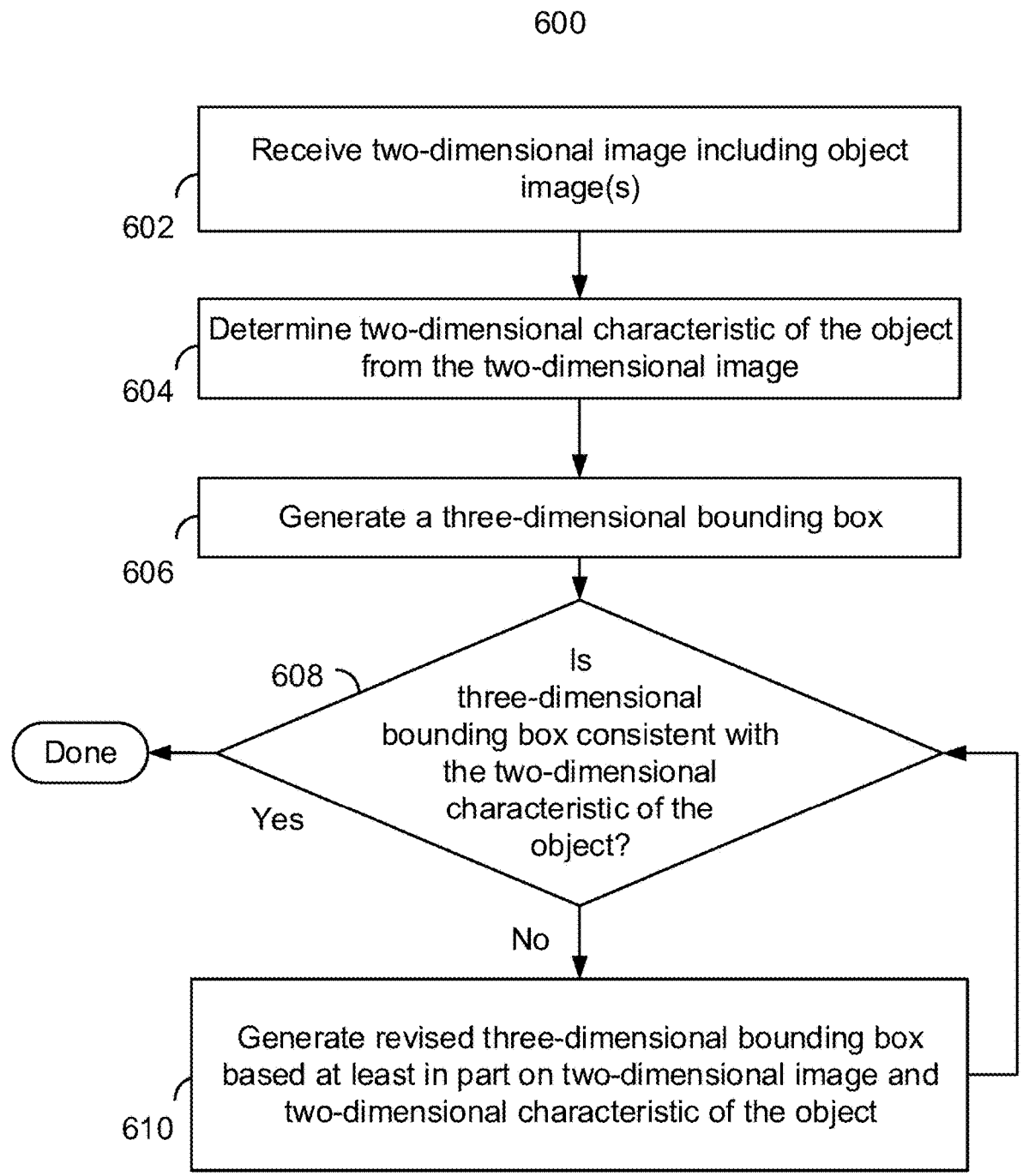
FIG. 6 shows a flowchart of an illustrative process to associating the three-dimensional bounding box with a tracked object based on two-dimensional image characteristic of the object, in accordance with some embodiments of the present disclosure.

FIG. 6 shows a flowchart of an illustrative process to generating revised three-dimensional bounding box with a tracked object based inconsistency with the two-dimensional image characteristics of the object, in accordance with some embodiments of the present disclosure. Process 600 may be executed at least in part by processing circuitry 102 of vehicle 101 and/or processing circuitry of server 136.

At 602, processing circuitry 102 of vehicle 101 may receive a two-dimensional image that includes various objects, some of which may be truncated and only partially captured. These objects may be identified, and two-dimensional bounding boxes calculated for them as above. In some embodiments, preprocessing may brighten the image or portions thereof, darkening the image or portions thereof, color-shifting the image (e.g., among color schemes, from color to grayscale, or another mapping), cropping the image, scaling the image, adjusting an aspect ratio of the image, adjusting the contrast of an image, performing any other suitable processing to prepare the image, or any combination thereof. In some embodiments, the preprocessing may generate bounding boxes around any identified objects.

At 604, processing circuitry 102 of vehicle 101 may determine the two-dimensional characteristics of the object identified from the two-dimensional images. For example, processing circuitry 102 of vehicle 101 may identify a type of object (e.g., a person, a tree, a car, a truck, a bicycle, a motorcycle, etc.), the color of the object (e.g., yellow, red, blue, etc.), an anchor point on the object (e.g., a starting point on the object for generating a two-dimensional bounding box), any distinguishing feature (e.g., letters, characters, etc.).

At 606, processing circuitry 102 of vehicle 101 may generate three-dimensional bounding boxes for each of the identified objects. The generation of three-dimensional bounding boxes may be performed in order to ameliorate the potential incorrect association of bounding boxes with objects in close proximity, by pulling in information (e.g., two-dimensional image characteristics of the object) from a previous frame of the object to a next frame. It may be observed that three-dimensional bounding boxes, as initially calculated for adjacent objects, will likely surround and combine into one three-dimensional bounding box that actually appears in the input image. For example, the processing circuitry 102 of vehicle 101 may extract characteristics (e.g., color, type of object, unique identifiers, anchor points, motion, etc.) of the object from a previous two-dimensional image. In some embodiments, the processing circuitry 102 may identify a fiducial point on an object in the two-dimensional image and may associate that object using that fiducial point on the object in the subsequent two-dimensional image to more accurately generate the three-dimensional bounding boxes. In some embodiments, the processing circuitry 102 may identify a color of a first object and in the two-dimensional image and may associate a bounding box with that object based on the color of the first object. The processing circuitry 102 may search for a similar color on the object in the subsequent two-dimensional image to generate three-dimensional bounding boxes around the object. In some embodiments, the generation of three-dimensional bounding boxes may comprise performing one or more traditional computer vision techniques to search for the associated object 301 based on two-dimensional image characteristics object.

At 608, processing circuitry 102 of vehicle 101 may check to determine whether any three-dimensional bounding boxes are consistent with the object's two-dimensional characteristic. More specifically, in some embodiments of the disclosure, the processing circuitry 102 continuously checks whether the three-dimensional boxes are accurate based on the two-dimensional characteristic of each object. This effectively indicates whether the three-dimensional bounding box accurately encloses the entire object or combines objects.

At 608, processing circuitry 102 of vehicle 101 may determine whether any three-dimensional bounding box is consistent with the object's two-dimensional characteristic and that the calculated three-dimensional bounding box is deemed to substantially encompass two-dimensional characteristic for the object 301. At 608, processing circuitry 102 of vehicle 101 may determine that a three-dimensional bounding box is not consistent with the object's two-dimensional characteristic and the processing circuitry 102 of vehicle 101 may then generate a revised three-dimensional bounding box based at least in part on the two-dimensional image and characteristics of an object at 610. For example, the processing circuitry 102 may revise the three-dimensional bounding box based on a different color in part of the three-dimensional bounding box. For example, the processing circuitry 102 may reduce or expand the size of the three-dimensional bounding box further based on the identified object in the two-dimensional image. In some embodiments, this flowchart may be used for an inaccurate three-dimensional bounding box and/or revisions to the three-dimensional bounding box. The processing circuitry 102 may be configured to make revisions to the three-dimensional bounding box and two-dimensional bounding boxes from the first three-dimensional bounding boxes.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A method comprising:
   tracking, by a processing circuitry associated with a vehicle, a tracked object in three-dimensional space, wherein the tracked object in the three-dimensional space is associated with a first two-dimensional image characteristic from a first two-dimensional image and a first three-dimensional bounding box for the tracked object in the first two-dimensional image;
   receiving, by the processing circuitry, subsequent to receiving the first two-dimensional image, a second two-dimensional image from a sensor associated with the vehicle;
   generating, by the processing circuitry, a second three-dimensional bounding box for an object in the second two-dimensional image;
   determining, by the processing circuitry, a second two-dimensional image characteristic of the object in the second two-dimensional image; and
   associating, by the processing circuitry, the second three-dimensional bounding box with the tracked object based on comparing the first three-dimensional bounding box to the second three-dimensional bounding box of the object and based on comparing the first two-dimensional image characteristic to the second two-dimensional image characteristic of the object.

2. The method of claim 1, wherein the tracking the tracked object in three-dimensional space comprises:
   tracking a plurality of objects in three-dimensional space, wherein the plurality of objects comprises the tracked object; and
   storing respective two-dimensional image characteristics for the plurality of objects.

3. The method of claim 2, wherein the associating the second three-dimensional bounding box with the tracked object comprises comparing the second two-dimensional image characteristic with the stored respective two-dimensional image characteristics for the objects.

4. The method of claim 1, wherein the second two-dimensional image characteristic of the object is selected from one or more of:
   a) an anchor point positioned on the second two-dimensional image for the object;
   b) raw pixel information on the second two-dimensional image for the object; or
   c) features of the second two-dimensional image identified from a neural network.

5. The method of claim 1, further comprising determining an angular orientation of the object in the two-dimensional image, wherein the generating the second three-dimensional bounding box for the object is based at least in part on the angular orientation of the object.

6. The method of claim 1, wherein the generating the second three-dimensional bounding box for the object in the two-dimensional image comprises:
   identifying the object in the second two-dimensional image;
   generating a two-dimensional bounding box for the object in the second two-dimensional image;
   determining a dimension associated with the object; and
   generating the second three-dimensional bounding box based on the two-dimensional bounding box for the object and the dimension associated with the object.

7. The method of claim 1, wherein the generating the second three-dimensional bounding box for the object in the second two-dimensional image comprises inputting the received two-dimensional image of the object into a neural network and outputting the second three-dimensional bounding box.

8. The method of claim 1, wherein the determining the second two-dimensional image characteristic of the object comprises performing a neural network analysis on pixels of the second two-dimensional image to identify the second two-dimensional image characteristic of the object, or comparing color variations on the pixels of the second two-dimensional image to identify the second two-dimensional image characteristic of the object.

9. A system comprising:
a sensor associated with a vehicle; and
a processing circuitry associated with the vehicle configured to:
track a tracked object in three-dimensional space, wherein the tracked object in the three-dimensional space is associated with a first two-dimensional image characteristic from a first two-dimensional image and a first three-dimensional bounding box for the tracked object in the first two-dimensional image;
receive, subsequent to receiving the first two-dimensional image, a second two-dimensional image from the sensor;
generate a second three-dimensional bounding box for an object in the second two-dimensional image;
determine a second two-dimensional image characteristic of the object in the second two-dimensional image; and
associate the second three-dimensional bounding box with the tracked object based on comparing the first three-dimensional bounding box to the second three-dimensional bounding box of the object and based on comparing the first two-dimensional image characteristic to the second two-dimensional image characteristic of the object.

10. The system of claim 9, wherein the processing circuitry is further configured to:
track a plurality of objects in three-dimensional space, wherein the plurality of objects comprises the tracked object, and
track the tracked object in three-dimensional space by storing respective two-dimensional image characteristics for the plurality of objects.

11. The system of claim 10, wherein the processing circuitry is further configured to associate the second three-dimensional bounding box with the tracked object by comparing the second two-dimensional image characteristic with the stored respective two-dimensional image characteristics for the objects.

12. The system of claim 9, wherein the second two-dimensional image characteristic of the object is selected from one or more of:
a) an anchor point positioned on the second two-dimensional image for the object;
b) raw pixel information on the second two-dimensional image for the object; or
c) features of the second two-dimensional image identified from a neural network.

13. The system of claim 9, wherein the processing circuitry is further configured to determine an angular orientation of the object in the two-dimensional image, wherein the processing circuitry generates the second three-dimensional bounding box for the object based at least in part on the angular orientation of the object.

14. The system of claim 9, wherein the processing circuitry is further configured to generate the second three-dimensional bounding box for the object in the two-dimensional image by:
identifying the object in the second two-dimensional image;
generating a two-dimensional bounding box for the object in the second two-dimensional image;
determining a dimension associated with the object; and
generating the second three-dimensional bounding box based on the two-dimensional bounding box for the object and the dimension associated with the object.

15. The system of claim 9, wherein the processing circuitry is further configured to generate the second three-dimensional bounding box for the object in the second two-dimensional image by inputting the received two-dimensional image of the object into a neural network and outputting the second three-dimensional bounding box.

16. The system of claim 9, wherein the processing circuitry is further configured to determine the second two-dimensional image characteristic of the object by performing a neural network analysis on pixels of the second two-dimensional image to identify the second two-dimensional image characteristic of the object or comparing color variations in the pixels of the second two-dimensional image to identify the second two-dimensional image characteristic of the object.

17. A non-transitory computer-readable medium having non-transitory computer-readable instructions encoded thereon, that when executed by processing circuitry, cause the processing circuitry to:
track a tracked object in three-dimensional space, wherein the tracked object in the three-dimensional space is associated with a first two-dimensional image characteristic from a first two-dimensional image and a first three-dimensional bounding box for the tracked object in the first two-dimensional image;
receive, subsequent to receiving the first two-dimensional image, a second two-dimensional image from a sensor associated with a vehicle;
generate a second three-dimensional bounding box for an object in the second two-dimensional image;
determine a second two-dimensional image characteristic of the object in the second two-dimensional image; and
associate the second three-dimensional bounding box with the tracked object based on comparing the first three-dimensional bounding box to the second three-dimensional bounding box of the object and based on comparing the first two-dimensional image characteristic to the second two-dimensional image characteristic of the object.

18. The non-transitory computer-readable medium of claim 17, wherein the instructions encoded thereon, when executed by processing circuitry, further cause the processing circuitry to:
track a plurality of objects in three-dimensional space, wherein the plurality of objects comprises the tracked object, and
track the tracked object in three-dimensional space by storing respective two-dimensional image characteristics for the plurality of objects.

19. The method of claim 1, wherein the first two-dimensional image characteristic is associated with a first object class of the tracked object, the second two-dimensional image characteristic is associated with a second object class of the object in the second two-dimensional image, and wherein the associating the second three-dimensional bounding box with the tracked object is further based on comparing the first object class of the tracked object to the second object class of the object in the second two-dimensional image.

20. The system of claim 9, wherein the first two-dimensional image characteristic is associated with a first object class of the tracked object, the second two-dimensional image characteristic is associated with a second object class of the object in the second two-dimensional image, and wherein the processing circuitry is further configured to associate the second three-dimensional bounding box with the tracked object based on comparing the first object class of the tracked object to the second object class of the object in the second two-dimensional image.

* * * * *